(12) United States Patent
Kuang et al.

(10) Patent No.: US 10,409,768 B2
(45) Date of Patent: Sep. 10, 2019

(54) MANAGING DATA INCONSISTENCIES IN FILES OF FILE SYSTEMS

(71) Applicant: EMC IP Holding Company LLC, Hopkinton, MA (US)

(72) Inventors: Yaming Kuang, Shanghai (CN); Frankie Wei Fang, Shanghai (CN); Walter C. Forrester, Berkeley Heights, NJ (US); Yunfei Chen, Shanghai (CN); Feng Zhang, Shanghai (CN); Marshall Hansi Wu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 206 days.

(21) Appl. No.: 15/281,304

(22) Filed: Sep. 30, 2016

(65) Prior Publication Data

US 2018/0095955 A1 Apr. 5, 2018

(51) Int. Cl.
| | | |
|---|---|---|
| *G06F 16/00* | (2019.01) | |
| *G06F 16/11* | (2019.01) | |
| *G06F 16/13* | (2019.01) | |
| *G06F 16/17* | (2019.01) | |

(52) U.S. Cl.
CPC .............. *G06F 16/11* (2019.01); *G06F 16/13* (2019.01); *G06F 16/17* (2019.01)

(58) Field of Classification Search
None
See application file for complete search history.

(56) References Cited

U.S. PATENT DOCUMENTS

| | | | | |
|---|---|---|---|---|
| 7,506,213 B1* | 3/2009 | Cabrera, III | ........ | G06F 11/0727 714/26 |
| 8,613,108 B1* | 12/2013 | Aggarwal | ............. | H04L 63/101 455/411 |
| 2004/0103351 A1* | 5/2004 | Hirst | ................... | H04N 1/00002 714/710 |
| 2009/0070539 A1* | 3/2009 | Haustein | ............. | G06F 11/1435 711/162 |
| 2011/0066789 A1* | 3/2011 | Wakrat | ................ | G06F 12/0246 711/103 |
| 2012/0047341 A1* | 2/2012 | Ishinabe | ............. | G06F 11/1451 711/162 |
| 2015/0052415 A1* | 2/2015 | Um | ...................... | G06F 11/1056 714/768 |
| 2018/0032567 A1* | 2/2018 | Rao | ................... | G06F 17/30371 |

* cited by examiner

*Primary Examiner* — Son T Hoang
(74) *Attorney, Agent, or Firm* — Krishnendu Gupta; Deepika Bhayana

(57) ABSTRACT

A data inconsistency is detected in a file system data block of a file system. The file system includes a set of files, each file includes a set of file system data blocks. Information regarding a file including the data inconsistency is provided to a client of the file system. Based on the information, the client is enabled to determine an action for recovering from the data inconsistency.

18 Claims, 10 Drawing Sheets

MANAGING DATA INCONSISTENCIES IN FILES OF FILE SYSTEMS

CROSS REFERENCE TO RELATED APPLICATIONS

This application claims priority and is a continuation in part of co-pending U.S. patent application Ser. No. 14/501,855 titled "MANAGING DATA INCONSISTENCIES IN FILE SYSTEMS", filed Sep. 30, 2014, which is incorporated herein by reference for all purposes.

BACKGROUND

Technical Field

This application relates to managing data inconsistencies in files of file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

SUMMARY OF THE INVENTION

A method is used in managing data inconsistencies in files of file systems. A data inconsistency is detected in a file system data block of a file system. The file system includes a set of files, each file includes a set of file system data blocks. Information regarding a file including the data inconsistency is provided to a client of the file system. Based on the information, the client is enabled to determine an action for recovering from the data inconsistency.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
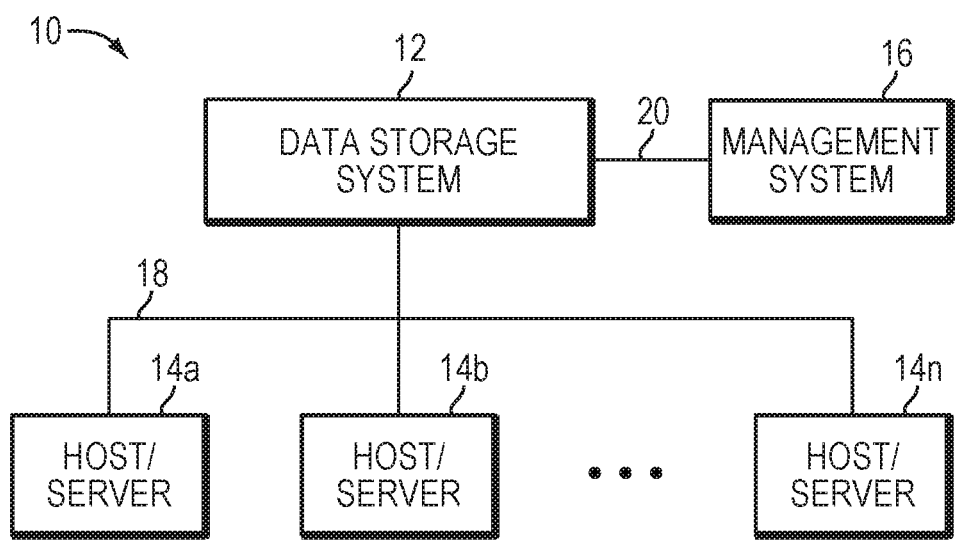
FIGS. 1-3 are examples of an embodiment of a computer system that may utilize the techniques described herein.

Described below is a technique for use in managing data inconsistencies in files of file systems, which technique may be used to provide, among other things, detecting a data inconsistency in a file system data block of a file system, where the file system includes a set of files, each file includes a set of file system data blocks, providing information regarding a file including the data inconsistency to a client of the file system, and based on the information, enabling the client to determine an action for recovering from the data inconsistency.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

The loss or corruption of metadata of a file system can result in inconsistencies or corruption of the file system. It should be appreciated that such corruptions or inconsistencies may develop in any one of numerous ways, including hardware failures, software bugs, and so on.

File System Checking (FSCK) is a process by which a data storage system verifies integrity of a file system and optionally repairs any inconsistencies found during verification of the file system. In at least some systems, a FSCK utility verifies metadata of a file system, recovers inconsistent metadata to a consistent state and thus restores the integrity of the file system. To verify metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

Generally, a set of sectors of storage devices (e.g., RAID devices or other block devices) on which a file system has been organized may become inconsistent such that a read operation performed on such sectors result into an error due to any number of inconsistency errors such as a mismatch in checksum or RAID CRC, or coherency errors. File system blocks of the file system residing on such inconsistent sectors are referred to as bad blocks.

Thus, when a user of a file system is unable to read/retrieve a file system block of the file system, such file system block may be referred to as a "bad block". Further, the user of the file system may be unable to read such bad block due to an error such as a data corruption or uncorrectable sector in a RAID device on which the file system has been organized. However, a user may be able to perform a write I/O operation on such bad block. Further, an inode in a file system is a data structure that is used to represent an object such as a file or a directory. An inode including bad blocks is referred to as a bad inode. Further, a bad block may be associated with one or more inodes based on whether a hard link has been created on a bad inode. Further, a file system bad block may be generated upon occurrence of a data corruption due to missing RAID CRC, a software bug, a dirty/lost cache entry or due to any other reasons.

Further, when a file system is organized on another lower-level file system in a storage system, bad blocks occurring in the lower-level file system becomes a source of bad blocks for the file system. In such a case, file system blocks associated with a portion of the lower-level file system identified by a recovery process as inconsistent are identified as bad blocks.

Conventionally, if an inconsistent file system block (also referred to herein as "bad block") is detected in a file system hierarchy of a file system, the file system is taken offline, marked as an inactive file system and a FSCK utility is executed to recover inconsistencies in the file system. Thus, in such a conventional system, if a file system block is marked as a bad block upon detecting data inconsistency in the file system block, the file system block is recovered by FSCK utility by either marking such file system block as a bad block or updating contents of such file system block (e.g., by writing zeros to the file system block) based on an option provided to FSCK utility before providing the updated file system block to a client indicating that the file system block has been recovered. Further, in such a conventional system, irrespective of the option provided to a recovery process (e.g., FSCK) indicating whether to mark an inconsistent file system block as a bad block or write zeros to the inconsistent file system block, there does not exists any mechanism to provide information regarding a file (e.g., file name, file path name) including such inconsistent file system block to a use of the file. Thus, in such a conventional system, when a user of a file system attempts to read contents of an inconsistent file system block, the file system block is provided to a user of the file system without providing any notification or information to the user regarding a file of the file system that may include such inconsistent file system block. Consequently, in such a conventional system, when a user attempts to access a file including a bad block, the user may encounter an error when performing a read operation on such bad block because the user does not possess any information regarding existence of such bad block in the file. Thus, in such a conventional system, when a recovery process detects bad blocks in a file system, specific information regarding files containing such bad blocks is not provided to a user of the file system thereby making it difficult or impossible for the user to avoid I/O errors when the user attempts to access such files containing such bad blocks. Consequently, in such a conventional system, a user of a file system does not get an opportunity to handle an inconsistent file system block situation and is unable to take any precautionary action because the user is not provided any information regarding which files in the file system includes bad blocks that have been identified by a recovery process. Thus, in such a conventional system, a user of a file system is unaware of which file in the file system has become inconsistent due to bad blocks thereby resulting into errors each time such bad blocks included in files are accessed by the user. In a conventional system, if a file including bad blocks or a bad inode is of a high importance to a user such as a configuration file or an index file, the user may receive an error such as service is unavailable or an application using such file may crash thereby significantly impacting the reliability of the application or a service using such file. Thus, it is a goal of the current invention to inform a user of a file system (e.g., block applications or a upper-level file system) regarding such bad blocks such that the user is provided information regarding files that corresponds to such bad blocks indicating that such file may no longer be accessed.

By contrast, in at least some implementations in accordance with the technique as described herein, upon detecting an inconsistent file system block in a file system, information regarding data inconsistency such as name of a file of the file system containing such inconsistent file system block, path name of the file, and an offset at which inconsistent file system block resides is provided to a user of the file system thereby enabling the user to make a determination as to what action is required based on the information provided to the user thereby avoiding read I/O operation errors and/or data loss. Thus, in at least one embodiment of the current technique, a user of a file system is able to make a determination regarding a type of action that is required upon detecting an inconsistent file system block in a file of the file system. Thus, in at least on embodiment of the current technique, detailed information regarding bad blocks such as an inode containing such bad blocks, block numbers for such bad blocks, and file path information for such bad blocks is provided to a user of a file system including such files. Further, in at least one embodiment of the current technique, file path information for bad blocks include full file path names for each inode that includes such bad blocks. Thus, in at least one embodiment of the current technique, enabling a user (e.g., CIFS or NFS user) of a file system organized on a storage system to handle files including inconsistent file system blocks identified during recovery of the file system allows the user to take any one of the following actions. In such a case, for example, one such action that a user may take is to either take the entire file offline which has been reported by a file system logic of the storage system as containing bad blocks. Further, in such a case, for example, another action that a user may take is to replace a file with a latest stable version such that upon receiving information regarding the file including inconsistent file system blocks, data inconsistencies may be resolved using previous versions of the file that has been saved by a backup procedure. Thus, in at least one embodiment of the current technique, file information such as full file path names for bad inodes in a file system including bad blocks is gathered and stored in a recovery log (e.g., FSCK log file) during recovery of the file system to enable a user of file system to take appropriate action for files associated with the bad inodes. Further, a bad block may be referenced by multiple files if multiple links have been created for a file including such bad block. In at least one embodiment of the current technique, information regarding multiple files that may reference a bad block is provided to a user.

In at least some implementations in accordance with the technique as described herein, the use of the managing data inconsistencies in files of file systems technique can provide one or more of the following advantages: preventing unavailability of user data by efficiently recovering inconsistent file system blocks of a file system by enabling a client of the file system to make a determination regarding what action to take regarding files including such inconsistent file system blocks, reducing I/O errors upon detecting inconsistent file system blocks by providing information regarding files containing such inconsistent file system blocks to a user of the files, and improving reliability of a file system by providing information regarding files including bad blocks identified during recovery of the file system to a user of the file system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
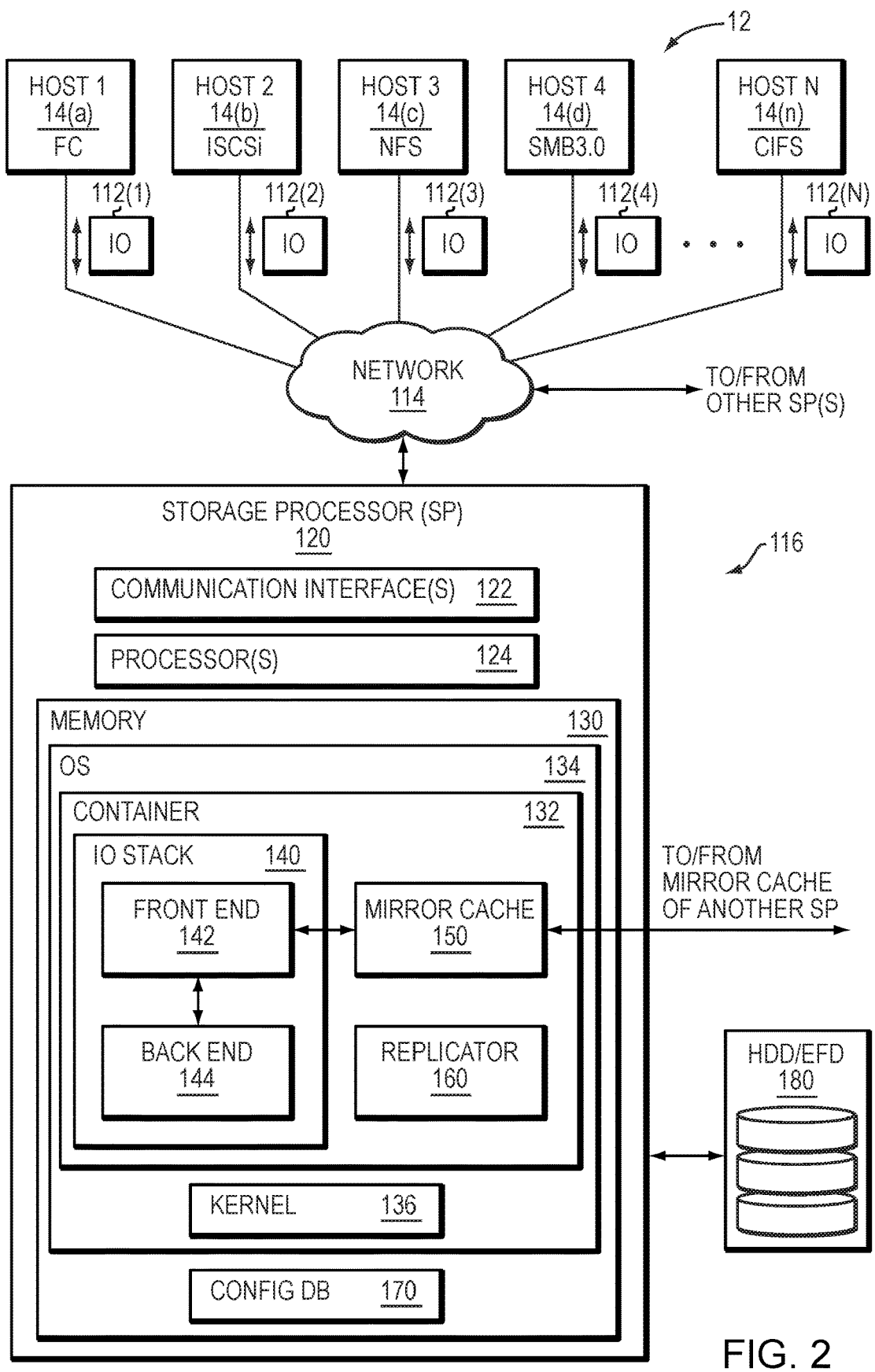

Referring now to FIG. 2, shown is an example of an embodiment of a computer system that may be used in connection with performing the technique or techniques described herein. FIG. 2 shows an example environment 12 in which embodiments of the improved technique hereof can be practiced. Here, multiple host computing devices ("hosts"), shown as devices 14(a) through 14(n), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 2, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 14(1-N) connect to the SP 120 using various technologies. For example, the host 14(1) can connect to the SP 120 using Fibre Channel (e.g., through a SAN). The hosts 14(2-N) can connect to the SP 120 using TCP/IP, to support, for example, iSCSI, NFS, SMB 3.0, and CIFS. Any number of hosts 14(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user space execution context within the operating system 134. In various examples, the memory 130 may include multiple containers like the container 132, with each container providing its own isolated user space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 2, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 14(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 2 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 3:
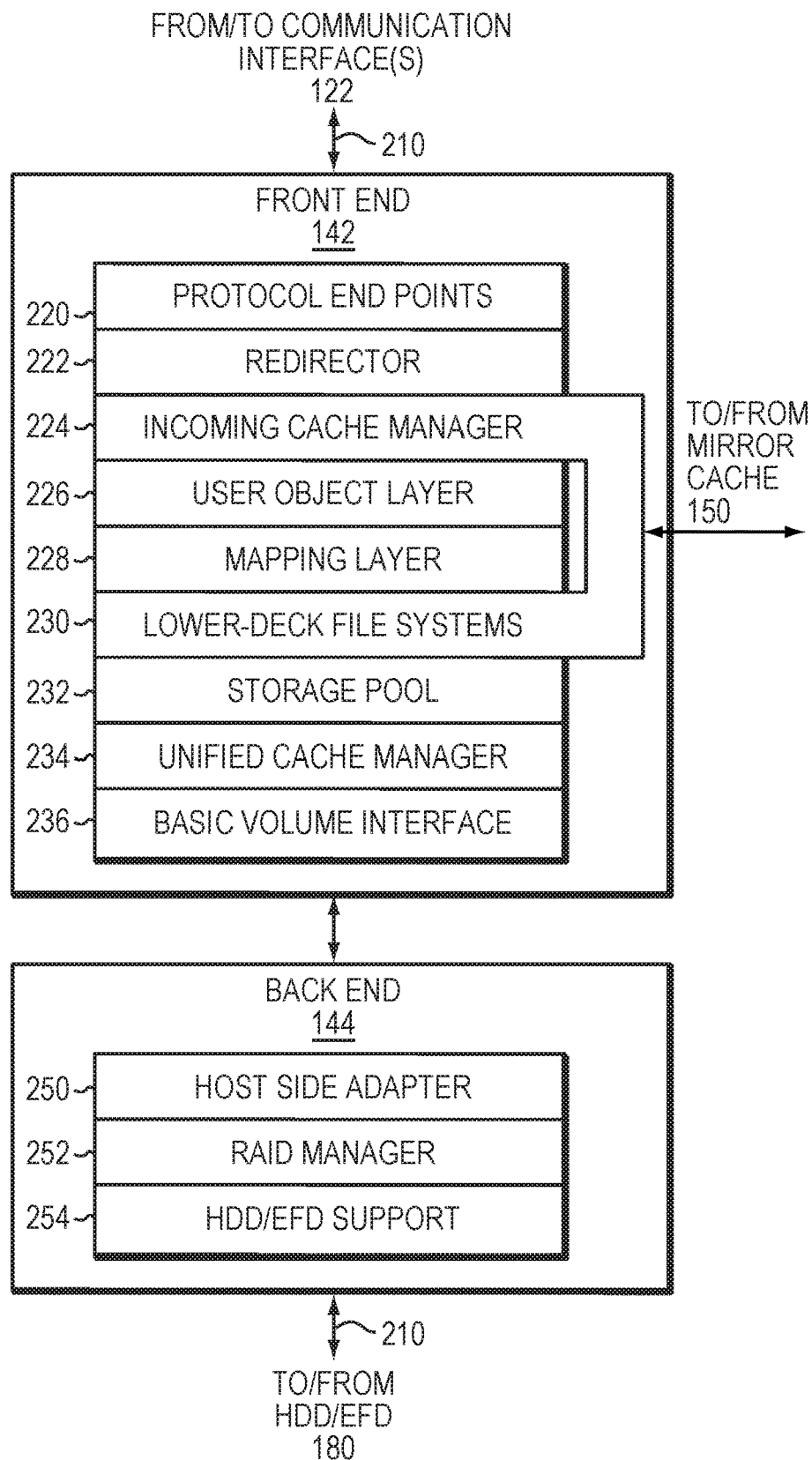

FIG. 3 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 14(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 14(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 2, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 4:
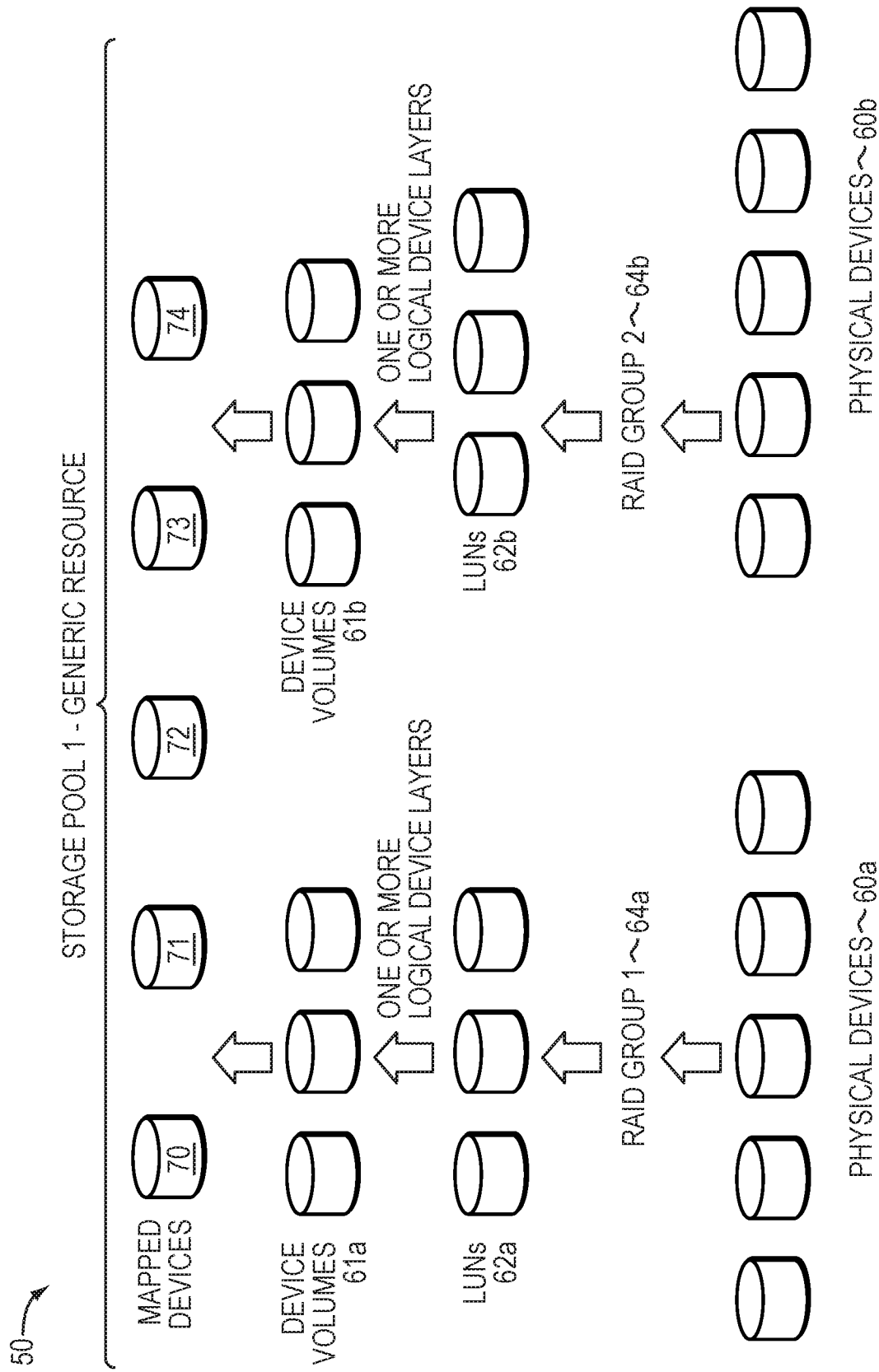
FIG. 4 is an example illustrating storage device layout.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
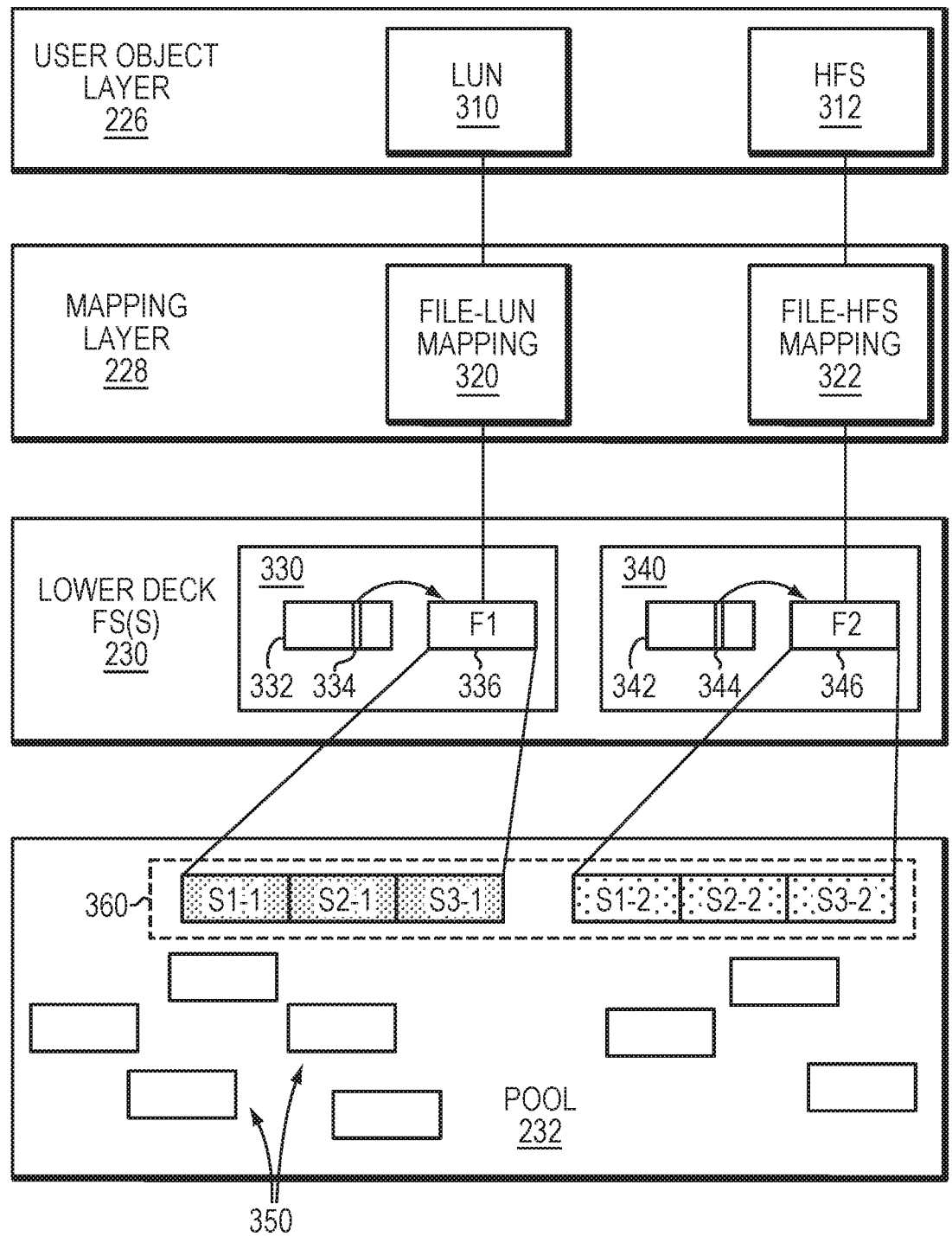
FIGS. 5-10 are diagrams illustrating in more detail components that may be used in connection with techniques herein.

FIG. 5 shows portions of the front end 142 in additional detail. Here, data objects include a LUN 310 and an HFS (host file system) 312. The object-volume mapping 228 includes a LUN-to-Volume mapping 320 and an HFS-to-Volume mapping 322. Using the approach described above, the LUN-to-Volume mapping 320 maps the LUN 310 to a first volume 336, and the HFS-to-Volume mapping 322 maps the HFS 312 to a second volume 346. The Volume-to-File mapping 228 maps the first and second internal volumes 334 and 344 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system.

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 6:
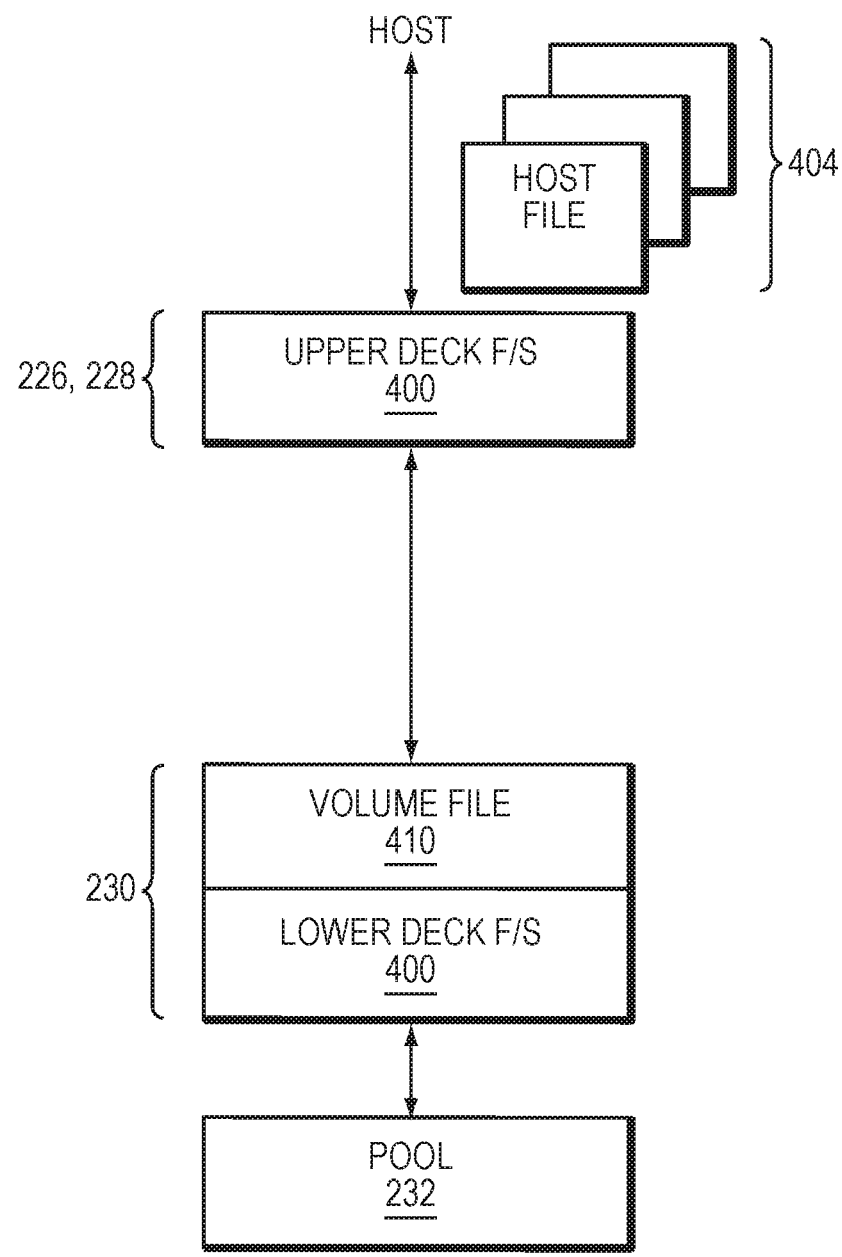

FIG. 6 shows another view of the organization of the data storage system useful for describing certain functionality as presented below. In FIG. 6, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400.

Figure 7:
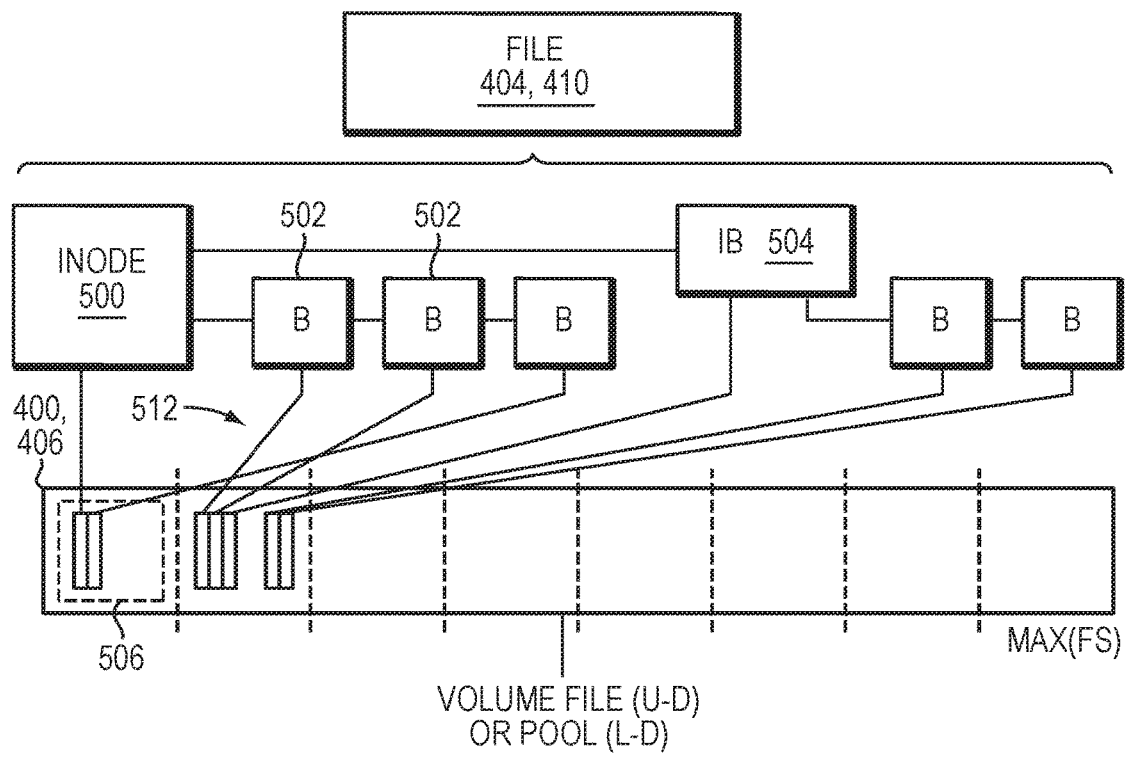

FIG. 7 illustrates certain details regarding files and file systems, applicable at both the upper layer (404, 400 in FIG. 6) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 7 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

The IB tree establishes a mapping 512 from a logical linear arrangement of blocks 502 of a file 404, 410 to corresponding block locations in the address space of the file system 400, 406. In general this mapping may be arbitrary, i.e., neither ordering nor adjacencies of blocks need to be preserved, and for such arbitrary mappings it is necessary to traverse the IB tree to locate a block in the file system 400, 406 based on an address of the block in the corresponding file 404, 410. This is the manner of operation of the upper-deck file system 400.

For the lower-deck file system 406, however, there is the possibility of operating in what is referred to as "direct mode" in which the mapping is constrained in a manner that enables block locations to be identified by calculation rather than by traversing the IB tree. Thus, in such a case, the block ordering is preserved, and block adjacencies are preserved within individual groups. In the simplified example of FIG. 7, this is shown for two groups, one having three blocks 502 and the other having two blocks 502. Calculation is generally much faster than IB tree traversal, and thus direct mode operation can provide improved file system performance.

In one embodiment, direct mode is a consequence of there being a single file in the file system 406. Rather than randomly allocating blocks to the file as it writes to them, a linear mapping is used that maps the first block in the file to the first data block in the file system, the second data block in the file to the second data block in the file system, and so on.

If there are no interspersed metadata structures, then the on disk location of any data block in a file can be simply the starting location of all data blocks in the file system plus the offset of the data block in the file. If the data blocks have metadata structures interspersed, the storage address can be algorithmically calculated given the file offset (the block in the file). The algorithm knows where the interspersed data structures are on disk so that it can correctly calculate the address of the data block on disk.

In another embodiment, a "mapped" mode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other mode. For the lower-deck file system 406, however, mapped mode is one of potentially multiple distinct operating modes, possible due to the internal nature and specialized use of the lower-deck file system 406 in the data storage system. The remaining description focuses on mapped mode operation of the lower-deck file system 406 in particular.

In FIG. 7 the mapping is indicated by generally crossing lines 512 extending between the blocks 502 of a volume file 410 and their locations in the lower-deck file system 406. In mapped mode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or sequentially ordered relative to existing areas where blocks 502 of the file are already stored.

With respect to the lower-deck file system 406 in particular, mapped mode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating mode in which predetermined calculations can be used instead of Inode/IB traversals.

Figure 8:
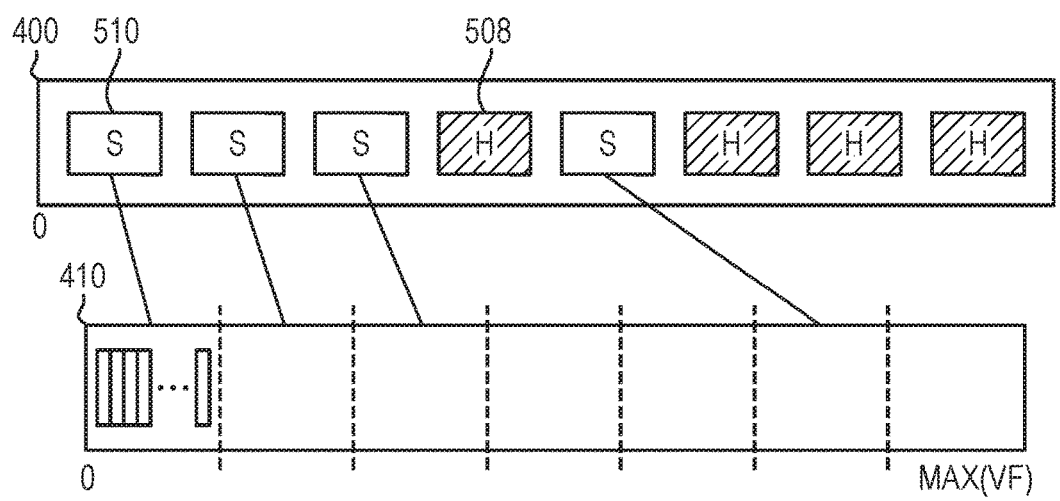

FIG. 8 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Slices 510 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs. The slice manager may be responsible for implementing a slice allocation policy and/or algorithm. For example, the slice manager may receive slice allocation requests, and maintain relevant statistical information regarding slices by using a slice allocation table.

In at least one embodiment of the current technique, the mapping between block pointers of data blocks associated with I/O requests (e.g., read, write) and physical addresses may be arbitrary or even random. The data blocks are therefore likely to reside on different slices and certainly on different stripes of underlying RAID groups.

Figure 9:
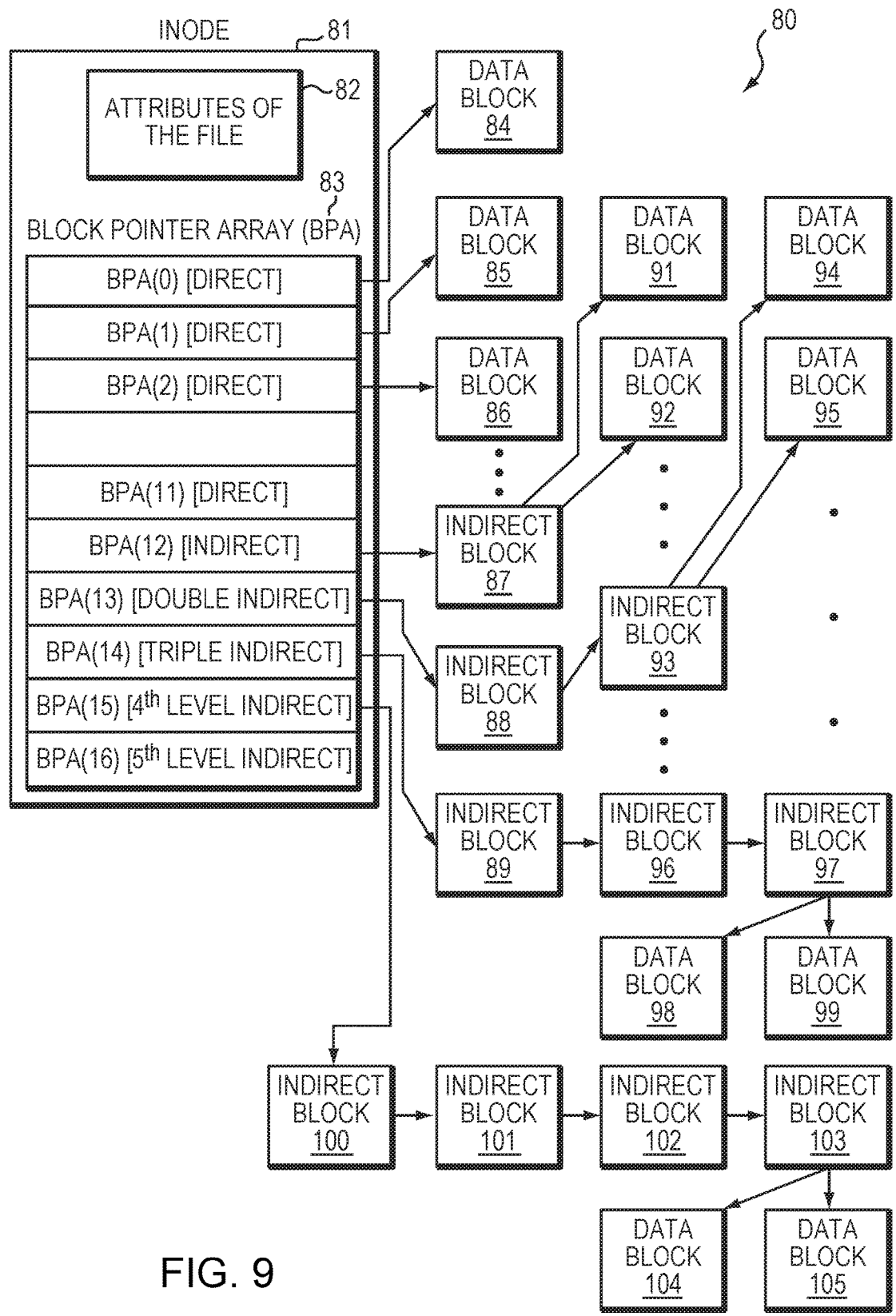

Referring to FIG. 9, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86) of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Thus, as described above herein, a file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Figure 10:
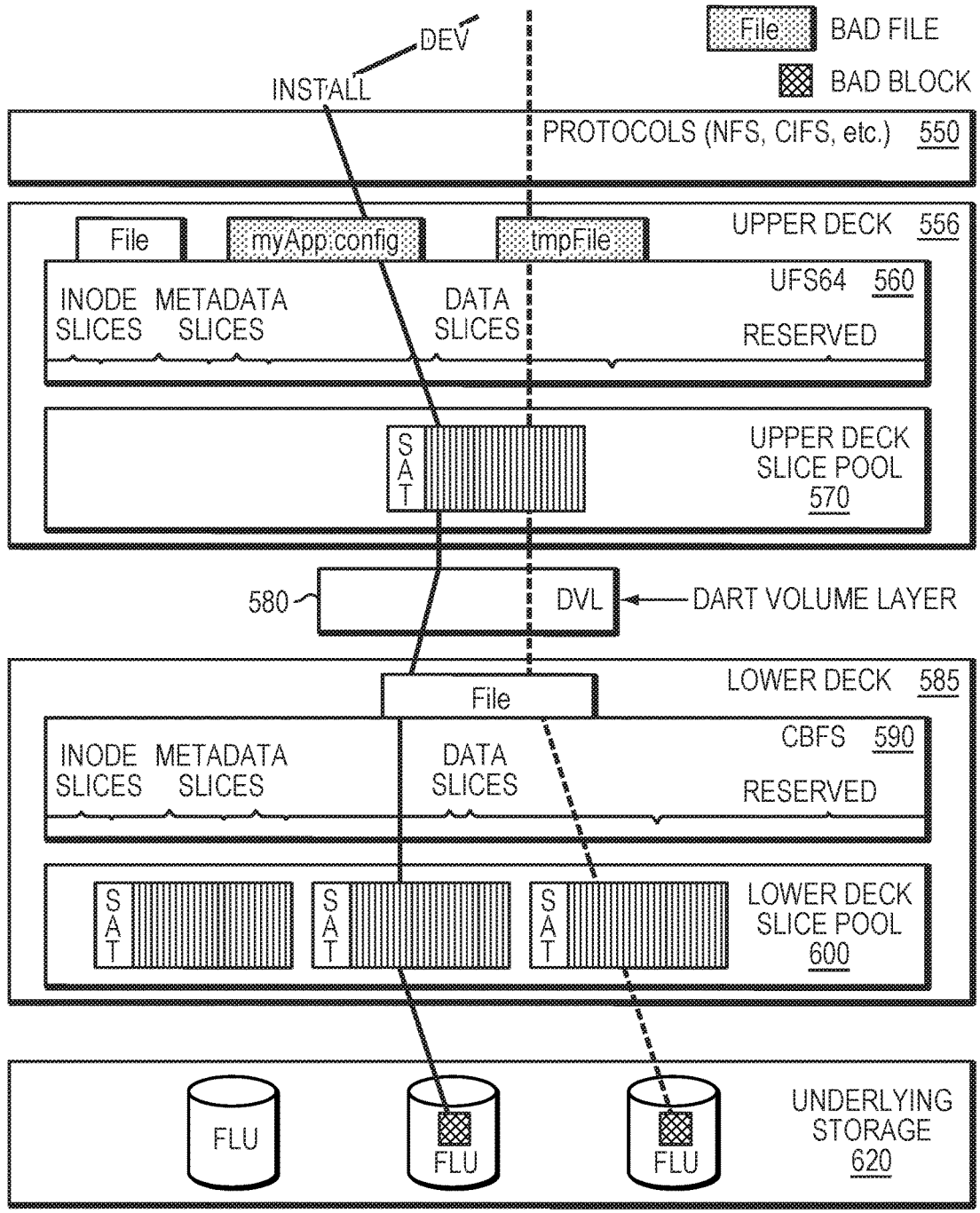

Referring to FIG. 10, shown is a detailed representation of components that may be included in an embodiment using the techniques described herein. Generally, a file system may include a set of directories and each directory of the set of directories include a set of files. In some arrangements, multiple client devices can connect to a storage system to access its directory objects, e.g., over a network. In some cases, the client devices operate with different network protocols that impose different file naming conventions. For example, some client devices use the NFS protocol, which employs a Unix file naming convention, whereas others use Microsoft Windows CIFS, which employs long file names (i.e., up to 256 characters, or "M256"). Also, some client devices use Microsoft DOS short file names (i.e., up to eight characters, followed by a single "." and a 3-character extension, or "M83"). Given these different naming conventions, any given directory object can have up to three different names, one for each protocol. Further, information about each directory object is provided in a respective "directory entry." Each directory entry component includes the name of a directory object, its inode number, and an indication of each protocol to which the name conforms. Thus, for example, if the name of a directory object conforms to Unix, M256, and M83, the directory entry component for that object indicates this condition, such that only a single directory entry component is stored for representing the directory object in all three protocols. In such cases, directory access can be achieved for all protocols using only a single hash. With a directory entry component storing indications of each protocol to which the component applies, information about the referenced directory object is typically accessed through a single directory entry component in a single leaf of an extendible hash tree. Further, a directory entry may be used to describe an entry associated with one or more name components of a file based on whether an inode name has been shared among one or more files.

In at least one embodiment of the current technique, with reference also to FIGS. 1-10, lower deck slice pool 600 manages a pool of slices using slice allocation tables ("SAT") where each slice represents a portion of storage space of underlying storage devices 620 in a storage system. Further, file system mapping component (also referred to herein as Common Block File System "CBFS") creates a lower-deck file system (also referred to herein as "lower-level file system") using slices from lower deck slice pool 600. Further, Dart Volume Layer 580 provides another level of mapping between lower deck 585 and upper deck 556. Further, upper deck slice pool 570 manages a pool of slices that are mapped to slices created by lower deck 585. File system management component (also referred to herein as "UFS64") 560 creates a set of files using slices from upper deck slice pool 570. Thus, upper deck 556 creates a set of files using storage space of a lower-level file created by lower deck 585. Further, files created by upper deck 556 may be accessed by a client of a storage system by any number of file system access protocols 550 such as NFS or CIFS.

In at least one embodiment of the current technique, a set of sectors may become inconsistent in underlying storage device due to any number of reasons such as corruption or RAID CRC mismatch. A set of slices in lower deck slice pool may include storage space from such inconsistent sector thereby making a portion of the set of slices inconsistent. Further, such inconsistent portion of the set of slices may be included in file system blocks of a lower-level file created by lower deck 585 resulting into bad blocks in the lower-level file. Further, an upper-level file system created by upper deck 556 by using the lower-level file including bad blocks results into the upper-level file containing bad blocks. Thus, for example, as illustrated in FIG. 10, myapp.config and tmpfile created by a client of a storage system includes bad blocks. In at least one embodiment of the current technique, when a recovery process determines bad blocks in lower-level file or upper level file, information regarding files including such bad blocks is provided to a user of such files. Further, information regarding files including bad blocks is stored in a recovery log as illustrated in FIG. 10. The information gathered in a recovery log includes the inode number of a file including bad blocks, information regarding inconsistent sectors including such bad blocks, the range of inconsistent blocks and the full path name of the file.

Further, in at least one embodiment of the current technique, file information provided to a client (also referred to herein as a "user") of a storage system is regarding files that are created and accessed by the client. Thus, the current technique enables a storage system to associate bad blocks to a file including such bad blocks and generate the name of the file, the file path, offset range for the bad blocks and store such information in a separate recovery log during recovery of a file system such that a user of the file system is able to take appropriate actions regarding such files thereby improving data reliability.

Figure 11:
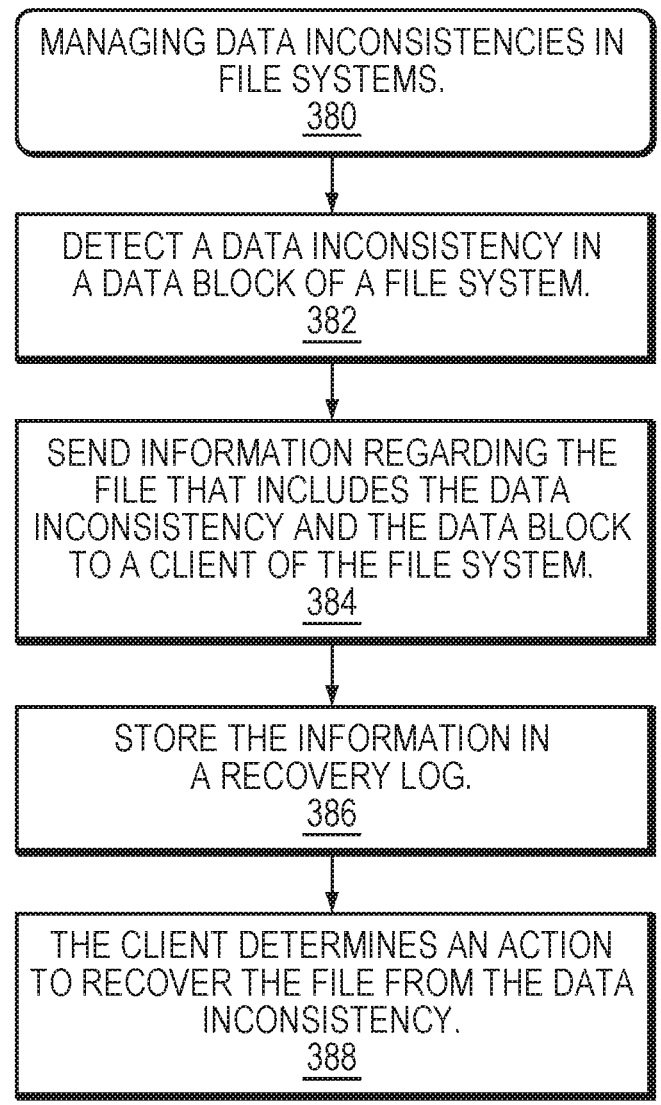
FIG. 11 is a flow diagram illustrating processes that may be used in connection with techniques herein.

Referring to FIG. 11, shown is a flow diagram illustrating the method of managing data inconsistencies in file systems. With reference also to FIGS. 1-10, a data inconsistency is detected in a file system data block of a file system during recovery of the file system (step 382). The file system data block identified as inconsistent block (or "bad block") is associated with a file of the file system by determining that the file of the file system includes such bad block. Information regarding such file is provided to a client of the file system (step 384). Such information regarding the file including the bad block includes file inode number, file path name, range of bad blocks, and offset of the bad block and such information is stored in a recovery log (step 386). Upon receiving such information, the client makes a determination regarding the type of action to take to recover from such bad block (step 388).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, implemented by a computing device, for use in managing data inconsistencies in files of file systems, the method comprising:

detecting a data inconsistency in a file system data block of a file system during recovery of the file system, wherein the file system includes a set of files, each file includes a set of file system data blocks;

responsive to the detecting of the data inconsistency, providing information regarding a file including the data inconsistency to a user of the file system, wherein the information includes a path name of the file and an offset within the file at which the file system data block including the data inconsistency resides, wherein the information is stored in a recovery log;

based on the information, enabling the user to determine a type of action to take for recovering the file system from the data inconsistency;

responsive to the enabling the user to determine the type of action to take, avoiding subsequent I/O operations on the file.

2. The method of claim 1, wherein the file system is represented by a file system hierarchy, the file system hierarchy including a set of indirect data blocks, each indirect data block including a set of file system data blocks.

3. The method of claim 1, wherein the detecting the data inconsistency further comprising:

evaluating metadata of each file system data block of the set of file system data blocks.

4. The method of claim 1, wherein the information regarding the data inconsistency includes a file inode number, and a range of inconsistent file system data blocks.

5. The method of claim 1, wherein the user performs the action based on the information provided to the user.

6. The method of claim 1, wherein the data inconsistency is detected upon performing a file system recovery operation on the file system, wherein the file system recover operation creates the recovery log.

7. The method of claim 1, wherein the information regarding the file provided to the user is for the file created by the user on a storage system for accessing the file.

8. The method of claim 1, wherein the file system is created using storage space from a lower-level file system, wherein a data inconsistency in file system data blocks of the lower-level file system creates the data inconsistency in the file system data block of the file system.

9. The method of claim 1, wherein the file system data block is referred to by at least two files, wherein the information regarding the at least two files is provided to the user.

10. A system for use in managing data inconsistencies in files of file systems, the system comprising a hardware processor configured to:

detect a data inconsistency in a file system data block of a file system during recovery of the file system, wherein the file system includes a set of files, each file includes a set of file system data blocks;

responsive to the detecting of the data inconsistency, provide information regarding a file including the data inconsistency to a user of the file system, wherein the information includes a path name of the file and an offset within the file at which the file system data block including the data inconsistency resides, wherein the information is stored in a recovery log;

based on the information, enable the user to determine a type of action to take for recovering the file system from the data inconsistency;

responsive to the enabling the user to determine the type of action to take, avoid subsequent I/O operations on the file.

11. The system of claim 10, wherein the file system is represented by a file system hierarchy, the file system hierarchy including a set of indirect data blocks, each indirect data block including a set of file system data blocks.

12. The system of claim 10, wherein the detecting the data inconsistency further comprising:
   evaluating metadata of each file system data block of the set of file system data blocks.

13. The system of claim 10, wherein the information regarding the data inconsistency includes a file inode number, and a range of inconsistent file system data blocks.

14. The system of claim 10, wherein the user performs the action based on the information provided to the user.

15. The system of claim 10, wherein the data inconsistency is detected upon performing a file system recovery operation on the file system, wherein the file system recover operation creates the recovery log.

16. The system of claim 10, wherein the information regarding the file provided to the user is for the file created by the user on a storage system for accessing the file.

17. The system of claim 10, wherein the file system is created using storage space from a lower-level file system, wherein a data inconsistency in file system data blocks of the lower-level file system creates the data inconsistency in the file system data block of the file system.

18. The system of claim 10, wherein the file system data block is referred to by at least two files, wherein the information regarding the at least two files is provided to the user.

* * * * *